No. 674,213. Patented May 14, 1901.
E. OLDFIELD.
RACK AND PINION MECHANISM.
(Application filed Oct. 25, 1900.)
(No Model.)

WITNESSES

INVENTOR,
Edwin Oldfield,
BY
Frank H. Allen
ATTORNEY.

UNITED STATES PATENT OFFICE.

EDWIN OLDFIELD, OF NORWICH, CONNECTICUT.

RACK-AND-PINION MECHANISM.

SPECIFICATION forming part of Letters Patent No. 674,213, dated May 14, 1901.

Application filed October 25, 1900. Serial No. 34,333. (No model.)

*To all whom it may concern:*

Be it known that I, EDWIN OLDFIELD, a citizen of the United States, residing at Norwich, New London county, Connecticut, have invented certain new and useful Improvements in Rack-and-Pinion Mechanism, of which the following is a full, clear, and exact description.

This invention relates to rack-and-pinion mechanism, and has for its object the provision, in such mechanism, of devices which shall practically eliminate the element of friction.

Said mechanism, briefly described, consists of a shaft, a circumferentially-grooved collar mounted thereon, a pinion-gear having a hub that surrounds the said collar and is provided with an interior groove, a ring of balls seated in said grooves, and a rack formed with teeth that mesh with the said pinion-teeth and with a lateral extension that bears upon the pinion-hub, the said pinion being formed with a notch leading into the said grooves of such size that the balls must be forced therethrough, as I shall explain hereinafter.

Figure 1:
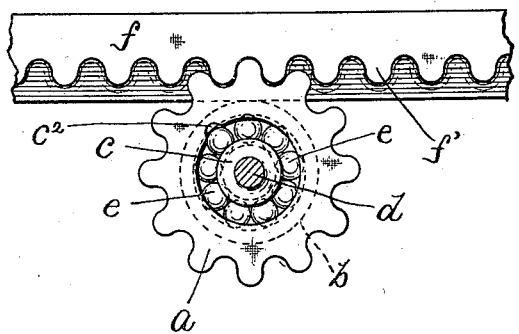
Figure 2:
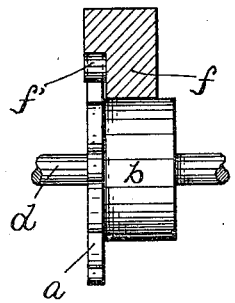
Figure 3:
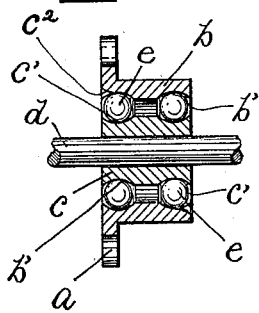

My invention is illustrated in the accompanying drawings, Figures 1 and 2 being, respectively, side and end views of a rack-bar and pinion embodying this invention. Fig. 3 is a central sectional view taken through the pinion, illustrating particularly the manner in which the balls are supported therein.

Referring to the drawings, the letter $a$ denotes the pinion, and $b$ the said hub or roller. The letter $c$ denotes the said cylindrical block, and $d$ the axial supporting pin or stud passing centrally therethrough.

Raceways $b'$ $c'$ are provided, respectively, in the confronting faces of the hub $b$ and block $c$, in which balls $e$ are located. To enable the insertion of the balls $e$, the raceways $b'$ are each provided with a notch $c^2$, which cuts nearly into the center of said raceways, the said pinion and hub being preferably of slightly-flexible material, as rawhide, so that it is possible to force the balls through said notches into the raceways, and when thus in place the said balls, while free to travel in their respective raceways, cannot leave the same without being forced therefrom through the said notches.

The reference-letter $f$ denotes the rack-bar, said bar being supported upon the hub $b$ of the pinion $a$, and the letter $f'$ denotes the rack-teeth formed on a lateral extension of said bar and adapted to mesh with the pinion-teeth $a'$. When my newly-invented rack-and-pinion mechanism is in use, the rack $f$, if of considerable length, may be supported by several of the rollers $b$ and in such manner that the weight of the bar is in no way borne by the pinion-teeth, thus doing away with any possibility of the binding or undue wearing of the said teeth. It should also be noted that because of the meshing engagement of said teeth the rollers $b$ will not be revolved simply by frictional contact with the rack-bar, but will be caused to revolve in unison with the latter, thus preventing the slipping of the bar on the roller and all possibility of flat spots being worn upon the rolls, as might result if the latter became stuck or failed to rotate.

The ball-bearing provided for the pinions insures the free rotation of the latter and does away, as nearly as may be, with the frictional resistance that would otherwise be present.

Having thus described my invention, I claim—

1. In combination, a shaft, a circumferentially-grooved collar mounted thereon, a pinion-gear having an interior groove, a ring of balls seated in said grooves, the said pinion being formed with a notch $c^2$ of such size that the balls must be forced therethrough into the said grooves, as herein specified.

2. In combination, a shaft, a circumferentially-grooved collar mounted thereon, a pinion-gear having a hub of sleeve form that surrounds the said collar and is provided with an interior groove, a ring of balls seated in said grooves, as set forth, and a rack formed with teeth that mesh with the said pinion-teeth and with a lateral extension that bears upon the pinion-hub; the said pinion being formed with a notch $c^2$ of such size that the balls must be forced therethrough into the said grooves, as herein specified.

Signed at Norwich, Connecticut, this 16th day of October, 1900.

EDWIN OLDFIELD.

Witnesses:
FRANK H. ALLEN,
ALONZO M. LUTHER.